G. K. HENNIG.
MECHANICALLY OPERATED MUSICAL STRING INSTRUMENT.
APPLICATION FILED MAY 27, 1909.

1,079,046.

Patented Nov. 18, 1913.

4 SHEETS—SHEET 1.

Witnesses.

Inventor.

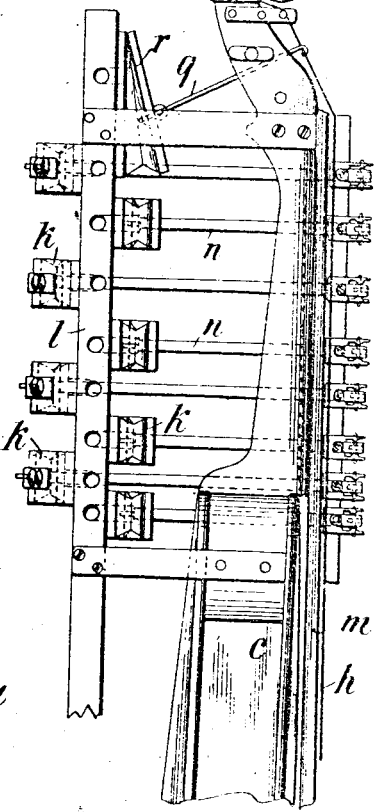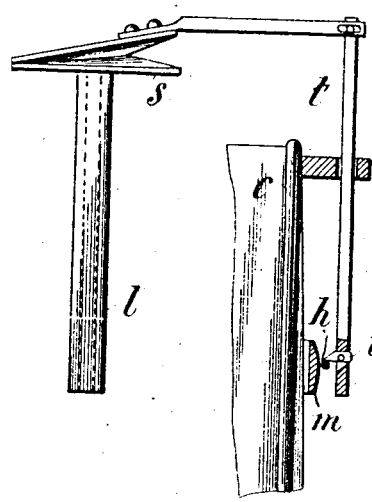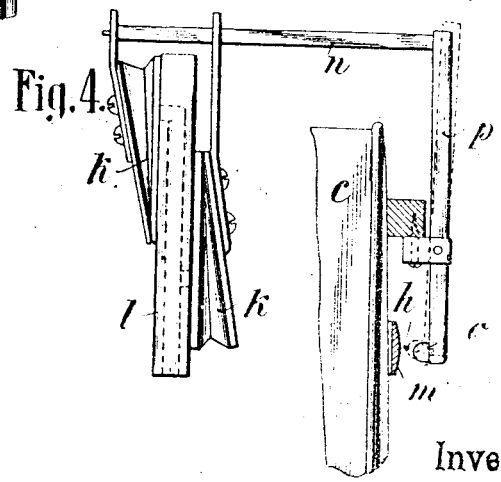

G. K. HENNIG.
MECHANICALLY OPERATED MUSICAL STRING INSTRUMENT.
APPLICATION FILED MAY 27, 1909.
1,079,046.
Patented Nov. 18, 1913.
4 SHEETS—SHEET 3.
Fig. 6.
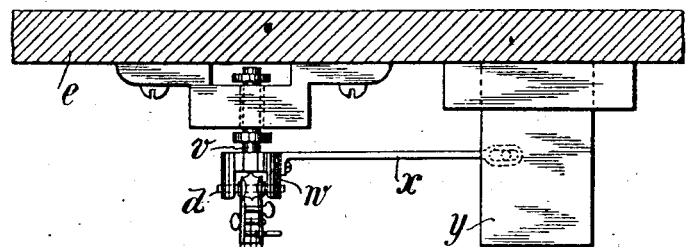
Fig. 9.
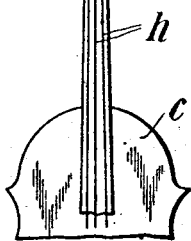
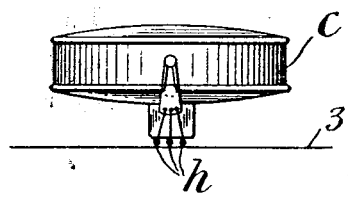
Fig. 7.
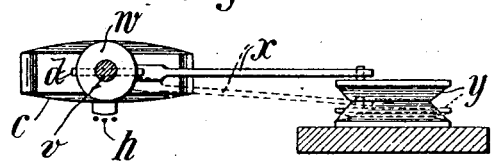
Witnesses.
Jesse N. Lutton.
Inventor.
Gustav Karl Hennig
by Henry Orth Jr.
Atty.

G. K. HENNIG.
MECHANICALLY OPERATED MUSICAL STRING INSTRUMENT.
APPLICATION FILED MAY 27, 1909.

1,079,046.

Patented Nov. 18, 1913.

4 SHEETS—SHEET 4.

Witnesses.
Jesse N. Lutton
B. Sommers

Inventor.
Gustav Karl Hennig
by Henry Orth Jr.
atty

UNITED STATES PATENT OFFICE.

GUSTAV KARL HENNIG, OF WAHREN, GERMANY, ASSIGNOR TO THE FIRM OF LUDWIG HUPFELD AKTIENGESELLSCHAFT, OF LEIPZIG, GERMANY.

MECHANICALLY-OPERATED MUSICAL STRING INSTRUMENT.

1,079,046.

Specification of Letters Patent.  Patented Nov. 18, 1913.

Application filed May 27, 1909. Serial No. 498,623.

*To all whom it may concern:*

Be it known that I, GUSTAV KARL HENNIG, a subject of the King of Prussia, residing at 27 Bahnhofstrasse, Wahren, Saxony, Germany, have invented certain new and useful Improvements in Mechanically-Operated Musical String Instruments; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to mechanically operated musical instruments of the kind in which strings are caused to sound by mechanically operated bows of annular form, bands or other means for vibrating the strings.

The improved instrument comprises any desired number of violins or violin-like instruments arranged in close proximity to the annular bow or the like and the strings of which are brought against the hairs of the bow and thus caused to sound by suitable movement of the violins. The strings of the violins are at the same time pressed against the finger board by mechanically operated devices corresponding to the fingers of a violin player and the pitch of the sound or note is thereby determined. The construction of the apparatus may be such that each violin or the like only carries one string and consequently receives only a movement toward or away from the annular bow. Violins or the like may however be employed each of which carries several strings and then, in addition to the movement toward and away from the bow or the like it would also be moved about its longitudinal axis for the purpose of enabling the various strings to be brought into contact with the annular bow as desired.

The accompanying drawings illustrate a musical instrument embodying this invention.

Figure 1:
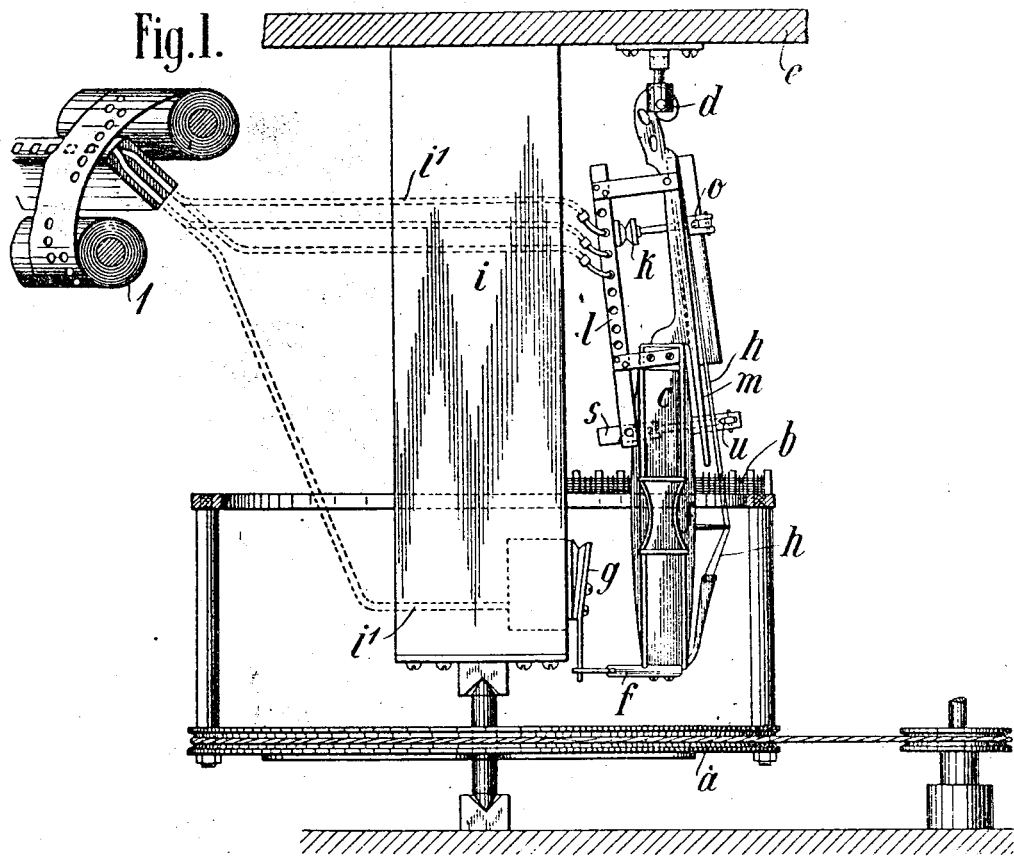
Figure 2:
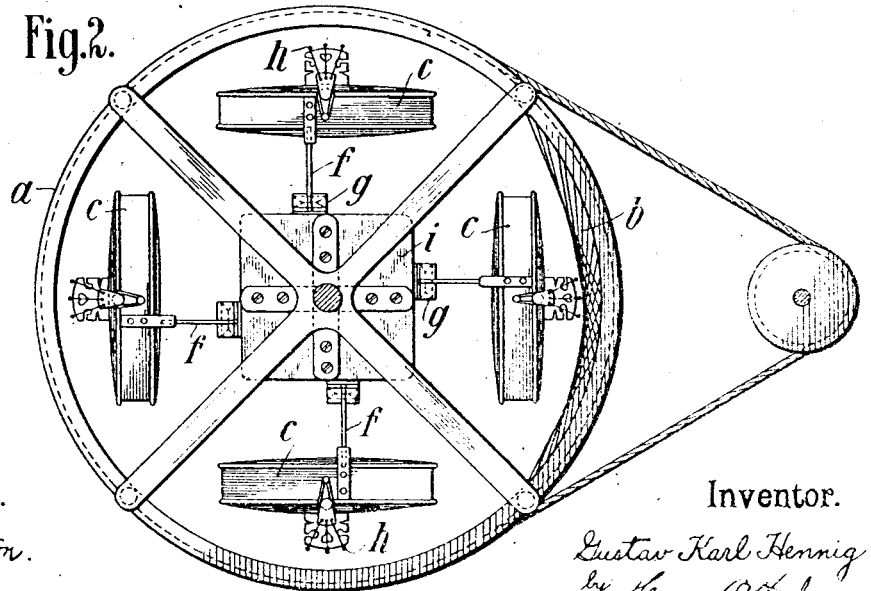
Figure 13:
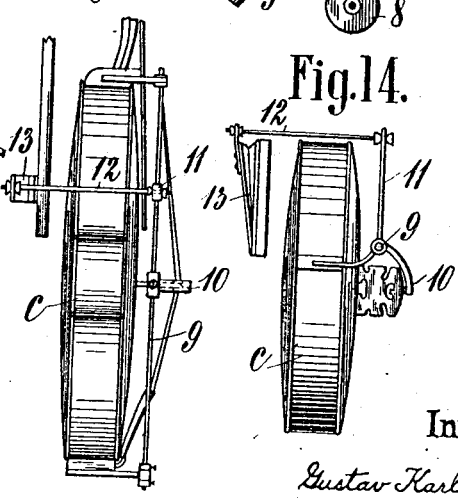
Figure 14:
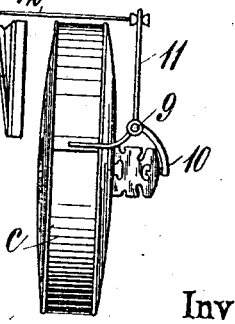

Figure 1 is an elevation of the new or improved instrument with parts removed for the sake of clearness. Fig. 2 is an inverted plan of the instrument. Figs. 3 and 4 are views to a larger scale showing the apparatus for pressing the strings down upon the finger board. Fig. 5 shows a device for producing a pizzicato effect. Figs. 6 and 7 are detail views. Figs. 8 to 12 are views of modifications of the bow or the like and the arrangement of the violin-instruments, and Figs. 13 and 14 show a device for muting or obtaining "*sotto voce*" effects.

In Figs. 1 to 6 $b$ is an annular bow adapted to be rotated by a cord pulley $a$, or by some other suitable means, and within it are arranged a number of violins or violin-like instruments $c$. Each violin is pivotally suspended by its neck from a pivot $d$ carried by a fixed frame $e$. The body of the violin is so connected by a rod $f$ to a bellows $g$ that when the bellows collapses the violin moves toward the hairing of the annular bow, and a string $h$, strung on the violin in the usual way, comes in contact therewith. When the bellows is inflated again the violin with its string is withdrawn from the bow. The bellows $g$ for moving the violins in this manner are arranged upon a box $i$ containing the air pipes $i^1$.

The supply of wind is controlled by a music sheet 1. In the construction shown it is assumed that the instrument is operated by vacuum, but by suitably altering the bellows and transmitting devices to the violins compressed air can be used. For pressing the violin strings down upon the finger board bellows $k$ are likewise employed. These bellows, as clearly shown in Figs 3 and 4, are arranged on an air passage box $l$ adjacent to the finger board $m$ and, by rods $n$ and double-armed levers $p$, press pressure pieces $o$ similar to the human fingers against the strings as soon as the particular bellows is put into communication with the air pipe by the music sheet. A tremolo or vibrato effect is produced by a pull rod $q$ embracing the string and which is caused to exert an alternating pressure upon the string by a bellows $r$.

When the violins $c$ are provided with several differently tuned strings, they receive, in addition to the movement toward the annular bow angular movements about their longitudinal axes. For this purpose each pivot $d$ must be so constructed that it will permit of the aforesaid angular movement of the violin. The angular movement of the violin is produced by one or more bellows which are likewise controlled by the music sheet. The construction of the apparatus may be such that for each string there is a shifting bellows which brings the violin into the position required for the bowing of the particular string and for this purpose moves it angularly about its longitudinal axis. Figs. 6 and 7 diagrammatically show a suitable arrangement for this purpose. The holder $w$ of the violin is itself capable of rotation about an axis $v$ and connected thereto by an arm $x$ is a bellows $y$ by the movement of which the violin is partially rotated about the axis $v$ to such an extent that the desired string can be bowed by the bow. A similar shifting bellows is provided for each string or group of strings. For the purpose of strengthening the tone each string might be combined with several simultaneously bowed and similarly or if desired differently tuned strings as shown in Fig. 9.

For a production of a pizzicato effect an arrangement such as shown in Fig. 5, for example, may be employed. This arrangement consists of a bellows $s$ the movement of which, influenced by the music sheet, so moves a rod $t$ transversely to the string that a hook mounted on the rod plucks the string like the finger. If the plucking is to take place in one direction only, that is to say for example when the bellows collapses, the hook $u$ is so connected to the rod $t$ that when the rod $t$ makes its backward or return stroke the hook rides over the string.

Figure 8:
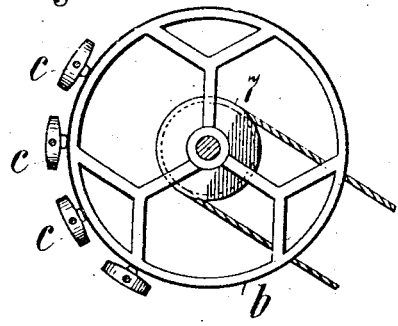

In the modification shown in Fig. 8 the violin-instruments embrace the bow.

Figure 10:
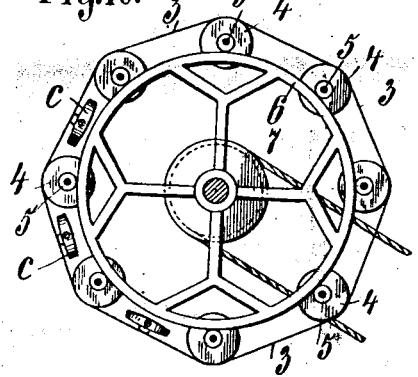

Fig. 10 shows an arrangement in which a hair band 3 or the like is moved by belt sheaves 4. These belt-sheaves are rotated by friction wheels 5, 6 and belt sheaves 7 and a suitable motor. The violin-instruments in Fig. 10 are embraced by the band 3 and in Fig. 11 the instruments embrace the band 3.

Figure 12:
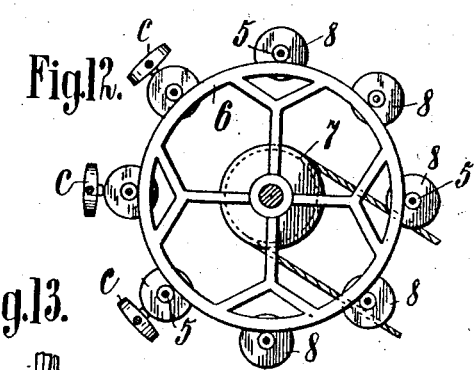
Figure 11:
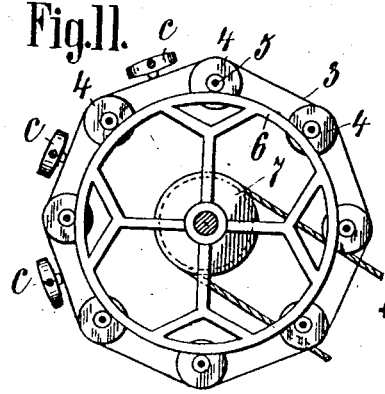

Fig. 12 shows a modification in which the strings of the instruments are actuated by rotating disks 8.

For the purpose of muting or obtaining "*sotto voce*" effects a device such as shown by way of example in Figs. 13 and 14 may be used. Such device comprises a bell-crank lever mounted on a rod 9 and one arm 10 of which forms the mute, while the other arm 11 is connected by a rod 12 to a bellows 13. By this bellows the muting arm can be lifted off the string or pressed onto the same as desired. The bellows 13 may be adapted to be controlled from the music sheet.

I claim:

1. In a mechanically operated musical instrument, an annular bow, means for rotating said bow, a number of violins having strings and pivotally suspended from their necks in close proximity to said annular bow, a bellows for each of said violins, means actuated by said bellows to move said violins toward and from said bow, and means for controlling the air supply to said bellows according to the music to be played.

2. In a mechanically operated musical instrument, an annular bow, means for rotating said bow, a number of violins having strings and pivotally suspended from their necks in close proximity to said annular bow, a bellows for each of said violins, rods connecting the lower ends of the violins to the bellows, and means for controlling the air supply to said bellows according to the music to be played.

3. In a mechanically operated musical instrument, an annular bow, means for rotating said bow, a number of violins each having a plurality of strings and suspended from their necks in close proximity to said annular bow and each mounted to partially rotate about its longitudinal axis, means to move said violins toward and from said bow, and means to partially rotate said violins about their longitudinal axes.

4. In a mechanically operated musical instrument, an annular bow, means for rotating said bow, a number of violins each having a plurality of strings and suspended from their necks in close proximity to said annular bow and each mounted to partially rotate about its longitudinal axis, pneumatically actuated means to move said violins toward and from said bow, and pneumatically actuated means to partially rotate said violins about their longitudinal axes.

5. In a mechanically operated musical instrument, an annular bow, means for rotating said bow, a number of violins each having a plurality of strings in close proximity to said bow, a number of violin holders corresponding to said violins, horizontally arranged pins carried by said holders from which said violins are pivotally suspended at their necks, fixed supports in which said holders can rotate about vertical axes, means to partially rotate said holders about their vertical axes, and means to move said violins toward and from said bow.

6. In a mechanically operated musical instrument, an annular bow, means for rotating said bow, a number of violins each having a plurality of strings in close proximity to said annular bow, a number of violin holders corresponding to said violins, horizontally arranged pins carried by said holders from which said violins are pivotally suspended at their necks, fixed supports in which said holders can rotate about vertical axes, an actuating bellows for each holder, arms connecting the holders to the bellows, and means to move said violins toward and from said bow.

7. In a mechanically operated instrument, an annular bow, means for rotating said bow, a number of violins each having strings in close proximity to said annular bow, means to move said violins toward and from said bow and means movable with the violins to press the strings of said violins upon the finger boards of the latter.

8. In a mechanically operated musical instrument, an annular bow, means for rotating said bow, a plurality of violins, each having strings in close proximity to said bow, means to move said violins toward and from said bow, and pneumatically actuated means carried by the violins to press the strings of said violins upon the finger boards of the latter.

9. In a mechanically operated musical instrument, an annular bow, means for rotating said bow, a number of violins having strings in close proximity to said annular bow, means to move said violins toward and from said bow, and fingering mechanism carried by each violin and comprising pressure pieces carried by said violins adjacent to the finger boards thereof and arranged over the strings, a bellows for each of said pressure pieces carried by the corresponding one of said violins, levers on which said pressure pieces are fixed, rods connecting the levers to the bellows, and means for controlling the air supply to said bellows.

10. In a mechanically operated musical instrument, an annular bow, means for rotating said bow, a number of violins each having strings in close proximity to said bow, means to move said violins toward and from said bow, and note sheet controlled tremolo means proximate the strings and acting thereon to exert a varying pressure on the strings of said violins.

11. In a mechanically operated musical instrument, an annular bow, means for rotating said bow, a number of violins each having strings in close proximity to said annular bow, means to move said violins toward and from said bow, and pneumatically actuated note sheet controlled tremolo means proximate the strings and acting thereon to exert a varying pressure on the strings.

12. In a mechanically operated musical instrument, an annular bow, means for rotating said bow, a plurality of violins each having strings in close proximity to said bow, means to move said violins toward and from said bow, rod levers connected thereto to engage said strings, bellows carried by the violins and to which said rods are connected, and means for controlling the air supply to said bellows.

13. In a musical instrument the combination with a plurality of pivotally mounted violins, of a bow common to all of them, a tracker bar, pneumatic mechanism to move the violins toward the bow, pneumatic mechanism to turn the violins, pneumatic fingering mechanism carried by the violins, pneumatic plectrum actions for the violins, and means to connect all the aforesaid pneumatic mechanisms to the tracker bar.

14. In a mechanically operated musical instrument, an annular bow, means for rotating said bow, a plurality of violins each having a plurality of strings in close proximity to said bow, pneumatic means to move said violins toward and from said bow and pneumatically actuated means to pluck said strings.

15. In a mechanically operated musical instrument, an annular bow, means for rotating said bow, a plurality of violins each having strings in close proximity to said annular bow, means to move said violins toward and from said bow, a sliding rod for each string of said violins, a hook pivoted on each rod in the path of the string corresponding to said sliding rod, a separate bellows connected to each rod, and means for controlling the air supply to all of said bellows.

16. In a mechanically operated musical instrument an annular bow, means for rotating said bow, a plurality of violins each having strings and suspended from their necks in close proximity to said bow and each mounted to partially rotate about its longitudinal axis, means to move said violins toward and away from said bow, means to partially rotate said violins about their longitudinal axes and means to press the strings upon the finger boards of said violins.

17. In a mechanically operated musical instrument, a bow, means for rotating said bow, a plurality of violins each having strings and suspended from their necks in close proximity to said bow and each mounted to partially rotate about its longitudinal axis, means to move said violins toward and from said bow, means to partially rotate said violins about their longitudinal axes, means to press the strings upon the finger boards of said violins, and means to exert an alternating pressure on the strings.

18. In a mechanically operated musical instrument, a bow, means for rotating said bow, a plurality of violins each having strings and suspended from their necks in close proximity to said bow and each mounted to partially rotate about its longitudinal axis, means to move said violins toward and away from said bow, means to partially rotate said violins about their longitudinal axes, means to press the strings upon the finger boards of said violins, means adapted to exert an alternating pressure on the strings, and means to pluck the latter.

19. In a mechanically operated musical instrument, a bow, means for rotating said bow, a plurality of violins each having strings and suspended from their necks in close proximity to said bow and each mounted to partially rotate about its longitudinal axis, pneumatically actuated means to move said violins toward and from said bow, pneumatically actuated means to partially rotate said violins about their longitudinal axes, pneumatically actuated means to press the strings upon the finger boards of said violins, pneumatically actuated means to exert an alternating pressure on the strings and pneumatically actuated means to pluck the strings.

20. In a self playing violin, a violin and a tracker bar in combination with a pneumatically-operated mute pneumatically connected to the tracker bar and in operative relation to the violin and adapted to coöperate with the bridge of the violin.

21. In combination, a bow, means for operating it, a movably mounted violin in proximity to the bow and having a plurality of strings, means to move the violin to and from the bow, and means to rotate the violin to present one or more strings to the bow.

22. In combination, a bow, means for operating it, a movably mounted violin in proximity to the bow and having a plurality of strings, note sheet controlled means to move the violin to and from the bow and note sheet controlled means to rotate the violin to present one or more strings to the bow.

23. In combination, a bow, means for operating it, a movably mounted violin having a plurality of strings and mounted to swing to and from the bow and about its longitudinal axis and means to move the violin to bring a string or strings into operative relation to the bow.

In testimony that I claim the foregoing as my invention, I have signed my name in presence of two subscribing witnesses.

GUSTAV KARL HENNIG.

Witnesses:
  EMIL GRUNDTUER,
  RUDOLPH FRICKE.